United States Patent
Tanabe (10) Patent No.: US 10,153,643 B2
(45) Date of Patent: Dec. 11, 2018

(54) WIRELESS POWER SUPPLY DEVICE AND WIRELESS POWER SUPPLY SYSTEM

(71) Applicant: Funai Electric Co., Ltd., Daito-shi, Osaka (JP)

(72) Inventor: Hideki Tanabe, Hirakata (JP)

(73) Assignee: Funai Electric Co., Ltd., Daito-shi (JP)

( * ) Notice: Subject to any disclaimer, the term of this patent is extended or adjusted under 35 U.S.C. 154(b) by 501 days.

(21) Appl. No.: 14/813,671

(22) Filed: Jul. 30, 2015

(65) Prior Publication Data

US 2016/0036242 A1  Feb. 4, 2016

(30) Foreign Application Priority Data

Jul. 30, 2014 (JP) .................. 2014-154921

(51) Int. Cl.
| | |
|---|---|
| H02J 5/00 | (2016.01) |
| H04B 5/00 | (2006.01) |
| H02J 50/12 | (2016.01) |
| H02M 3/335 | (2006.01) |
| H02M 3/337 | (2006.01) |
| H02M 1/00 | (2006.01) |

(52) U.S. Cl.
CPC ............... *H02J 5/00* (2013.01); *H02J 50/12* (2016.02); *H02M 3/3353* (2013.01); *H02M 3/3378* (2013.01); *H04B 5/0037* (2013.01); *H04B 5/0081* (2013.01); *H04B 5/0093* (2013.01); *H02M 2001/0058* (2013.01); *Y02B 70/1433* (2013.01); *Y02B 70/1491* (2013.01)

(58) Field of Classification Search
None
See application file for complete search history.

(56) References Cited

U.S. PATENT DOCUMENTS

| | | | |
|---|---|---|---|
| 2012/0146424 A1 | 6/2012 | Urano | |
| 2014/0175895 A1* | 6/2014 | Ishi | H02J 17/00 307/104 |
| 2014/0183971 A1 | 7/2014 | Endo et al. | |
| 2014/0183972 A1 | 7/2014 | Endo et al. | |
| 2014/0225450 A1 | 8/2014 | Endo et al. | |
| 2015/0054349 A1 | 2/2015 | Ishikuro et al. | |

FOREIGN PATENT DOCUMENTS

| | | | |
|---|---|---|---|
| EP | 2 720 349 A1 | 4/2014 | |
| JP | 2006-74848 A | 3/2006 | |
| JP | 2011-182012 A | 9/2011 | |
| JP | WO2012169584 A1 * | 12/2012 | ............. H01F 38/14 |
| JP | 2013-74755 A | 4/2013 | |
| WO | WO 2013/057896 A1 | 4/2013 | |
| WO | WO 2013/121904 A1 | 8/2013 | |
| WO | WO 2013/190809 A1 | 12/2013 | |

* cited by examiner

*Primary Examiner* — Jared Fureman
*Assistant Examiner* — James Evans
(74) *Attorney, Agent, or Firm* — Crowell & Moring LLP (57) ABSTRACT

A wireless power supply device includes a resonance circuit including a coil and a capacitor, a power supply portion that supplies AC power to the resonance circuit based on a drive signal having a prescribed drive frequency, and a controller that substantially matches the phase of the drive signal and the phase of oscillation of the resonance circuit by switching the direction of a current that flows into the coil.

20 Claims, 7 Drawing Sheets

FIG.1
FIRST EMBODIMENT 100

FIG.4
SECOND EMBODIMENT

FIG.6
THIRD EMBODIMENT

WIRELESS POWER SUPPLY DEVICE AND WIRELESS POWER SUPPLY SYSTEM

CROSS-REFERENCE TO RELATED APPLICATION

The priority application number JP2014-154921, Wireless Power Supply Device and Wireless Power Supply System, Jul. 30, 2014, Hideki Tanabe, upon which this patent application is based is hereby incorporated by reference.

BACKGROUND OF THE INVENTION

Field of the Invention

The present invention relates to a wireless power supply device and a wireless power supply system, and more particularly, it relates to a wireless power supply device and a wireless power supply system each including a resonance circuit.

Description of the Background Art

A wireless power supply device including a resonance circuit is known in general, as disclosed in Japanese Patent Laying-Open No. 2011-182012.

Japanese Patent Laying-Open No. 2011-182012 discloses a noncontact setting device (wireless power supply device) including a resonance circuit constituted by a power transmission coil that supplies power to a device to be set (receiver) in a noncontact manner and three capacitors connected in series to the power transmission coil. This noncontact setting device is configured to change the resonant frequency of the resonance circuit by changing the number of capacitors connected to the power transmission coil (to one, two, or three) by switches. Thus, in this noncontact setting device, the resonant frequency for optimally transmitting power is selected according to a power transmission distance (a distance between coils) to the device to be set.

In general, it is known that the resonant frequency of a resonance circuit of a wireless power supply device is changed due to temporal change, usage environment, etc. In this case, the resonant frequency of the resonance circuit is deviated from a desired resonant frequency. Consequently, the efficiency of power transmission from the wireless power supply device to a receiver is disadvantageously reduced due to change of the resonant frequency of the resonance circuit of the wireless power supply device.

In order to resolve the aforementioned disadvantage, the approach of the noncontact setting device described in Japanese Patent Laying-Open No. 2011-182012 is conceivably employed. More specifically, the resonant frequency of the resonance circuit of the wireless power supply device is conceivably changed by changing the number of capacitors connected to a power transmission coil by switches to correspond to change of the resonant frequency of the resonance circuit resulting from temporal change, usage environment, etc.

In this case, however, three capacitors must be provided to adjust change of the resonant frequency of the resonance circuit resulting from temporal change, usage environment, etc. Thus, the resonance circuit is disadvantageously increased in size and complicated in structure.

SUMMARY OF THE INVENTION

The present invention has been proposed in order to solve the aforementioned problems, and an object of the present invention is to provide a wireless power supply device and a wireless power supply system each capable of significantly reducing or preventing a reduction in the efficiency of power transmission to a receiver resulting from change of the resonant frequency of a resonance circuit in the power supply device while significantly reducing or preventing an increase in the size of the resonance circuit and complication of the structure of the resonance circuit.

In order to attain the aforementioned object, a wireless power supply device according to a first aspect of the present invention includes a resonance circuit including a coil and a capacitor, a power supply portion that supplies AC power to the resonance circuit based on a drive signal having a prescribed drive frequency, and a controller that substantially matches the phase of the drive signal and the phase of oscillation of the resonance circuit by switching the direction of a current that flows into the coil.

It is known that the phase of the drive signal is deviated from the phase of the oscillation generated in the resonance circuit when the drive frequency of the drive signal is different from the resonant frequency of the resonance circuit, and the phase of the drive signal and the phase of the oscillation generated in the resonance circuit are substantially matched when the drive frequency of the drive signal and the resonant frequency of the resonance circuit are substantially matched. As hereinabove described, the wireless power supply device according to the first aspect of the present invention is provided with the controller that substantially matches the phase of the drive signal and the phase of the oscillation of the resonance circuit by switching the direction of the current that flows into the coil. Thus, the oscillation (oscillatory waveform) of the resonance circuit can be forcibly changed in a direction of changing from rising to falling or a direction of changing from falling to rising in correspondence to forcible switching of the direction of the current that flows into the coil by the controller. Consequently, even when the resonant frequency of the resonance circuit is changed due to temporal change, usage environment, etc., the drive frequency (desired resonant frequency) of the drive signal and the resonant frequency of the resonance circuit (the phase of the drive signal and the phase of the oscillation generated in the resonance circuit) can be virtually substantially matched. Therefore, the change of the resonant frequency of the resonance circuit resulting from temporal change, usage environment, etc. can be adjusted, and hence a reduction in the efficiency of power transmission to a receiver resulting from the change of the resonant frequency of the resonance circuit in the power supply device can be significantly reduced or prevented. Furthermore, a plurality of (three) capacitors may not be provided to adjust the change of the resonant frequency of the resonance circuit resulting from temporal change, usage environment, etc., and hence an increase in the size of the resonance circuit and complication of the structure of the resonance circuit can be significantly reduced or prevented. Consequently, a reduction in the efficiency of power transmission to the receiver resulting from the change of the resonant frequency of the resonance circuit in the power supply device can be significantly reduced or prevented while an increase in the size of the resonance circuit and complication of the structure of the resonance circuit are significantly reduced or prevented.

The aforementioned wireless power supply device according to the first aspect preferably further includes a phase difference detector that detects a phase difference between the phase of the drive signal and the phase of the oscillation of the resonance circuit, and the controller preferably substantially matches the phase of the drive signal and the phase of the oscillation of the resonance circuit by switching the direction of the current that flows into the coil based on the phase difference between the phase of the drive signal and the phase of the oscillation of the resonance circuit detected by the phase difference detector. According to this structure, even in the case where no signal generation portion that generates a signal for directly indicating the timing of switching the direction of the current that flows into the coil is provided, for example, the timing of switching the direction of the current that flows into the coil can be indicated on the basis of the phase difference between the phase of the drive signal and the phase of the oscillation of the resonance circuit. Consequently, even in the case where no signal generation portion that generates the signal for directly indicating the timing of switching the direction of the current that flows into the coil is provided, the phase of the drive signal and the phase of the oscillation of the resonance circuit can be substantially matched.

In the aforementioned wireless power supply device according to the first aspect, the resonance circuit is preferably formed such that a phase difference between the phase of the drive signal and the phase of the oscillation of the resonance circuit is less than about a quarter period. According to this structure, the phase difference between the phase of the drive signal and the phase of the oscillation of the resonance circuit is small, and hence the phase of the drive signal and the phase of the oscillation of the resonance circuit can be easily substantially matched.

The aforementioned wireless power supply device according to the first aspect preferably further includes a signal generation portion that generates a signal whose phase is deviated by about 90 degrees with respect to a phase corresponding to the drive timing of the drive signal. According to this structure, a time point when the phase is deviated by about 90 degrees with respect to the phase corresponding to the drive timing of the drive signal can be easily determined by the signal generated by the signal generation portion.

In this case, the controller preferably substantially matches the phase of the drive signal and the phase of the oscillation of the resonance circuit by switching the direction of the current that flows into the coil at a time point when the phase is deviated by about 90 degrees with respect to the phase corresponding to the drive timing of the drive signal based on the signal generated by the signal generation portion. In the ideal case where the drive frequency of the drive signal and the resonant frequency of the resonance circuit are substantially matched, the oscillation (oscillatory waveform) of the resonance circuit changes from rising to falling or from falling to rising at the time point when the phase is deviated by about 90 degrees with respect to the phase corresponding to the drive timing of the drive signal. Thus, the wireless power supply device is formed as described above, whereby when the resonant frequency is changed, the oscillation (oscillatory waveform) of the resonance circuit can be easily changed in the direction of changing from rising to falling or changing from falling to rising at a time point when the oscillation (oscillatory waveform) of the resonance circuit changes from rising to falling or from falling to rising in the ideal case. Therefore, when the resonant frequency is changed, the oscillation (oscillatory waveform) of the resonance circuit can be easily changed to the oscillation (oscillatory waveform) of the resonance circuit in the ideal case.

In the aforementioned structure further including the signal generation portion, the signal generation portion preferably generates the signal that is substantially rectangular wave-shaped, and the controller preferably switches the direction of the current that flows into the coil at a time point corresponding to the rising or falling edge of the signal. According to this structure, the time point when the phase is deviated by about 90 degrees with respect to the phase corresponding to the drive timing of the drive signal can be more easily determined as the time point corresponding to the rising or falling edge of the wave-shaped signal.

The aforementioned wireless power supply device according to the first aspect preferably further includes a switch portion that switches the direction of the current that flows into the coil of the resonance circuit. According to this structure, the direction of the current that flows into the coil of the resonance circuit can be easily switched while an increase in the size of the resonance circuit and complication of the structure of the resonance circuit are significantly reduced or prevented due to the simple structure.

In the aforementioned wireless power supply device according to the first aspect, the resonance circuit preferably includes a first path allowing a current to flow into the coil from a prescribed direction and a second path allowing a current to flow into the coil from a direction opposite to the prescribed direction. According to this structure, the direction of the current that flows into the coil of the resonance circuit can be easily switched by the first path and the second path.

In this case, the wireless power supply device preferably further includes a switch portion that switches the direction of the current that flows into the coil of the resonance circuit by switching a path of the current that flows into the coil to either the first path or the second path. According to this structure, the switch portion can easily switch the direction of the current that flows into the coil of the resonance circuit by switching between the first path and the second path.

In the aforementioned structure further including the switch portion, the switch portion preferably includes a first switch element connected to a first end of the coil and a second switch element connected to a second end of the coil, and the switch portion preferably switches the path of the current that flows into the coil to either the first path or the second path by the first switch element and the second switch element. According to this structure, the first path and the second path are easily switched by the first switch element and the second switch element, whereby the direction of the current that flows into the coil of the resonance circuit can be easily switched.

In this case, the controller is preferably a switch controller that substantially matches the phase of the drive signal and the phase of the oscillation of the resonance circuit by controlling the first switch element and the second switch element. According to this structure, the switch controller can easily substantially match the phase of the drive signal and the phase of the oscillation of the resonance circuit by controlling the first switch element and the second switch element.

In the aforementioned structure in which the switch portion includes the first switch element and the second switch element, the first switch element and the second switch element each preferably include a semiconductor switch element. According to this structure, the first switch element and the second switch element can be driven at a relatively high speed, and hence the first path and the second path can be switched at a relatively high speed.

The aforementioned structure further including the phase difference detector preferably further includes an oscillation detector that detects the oscillation of the resonance circuit, and the phase difference detector preferably detects the phase difference between the phase of the drive signal and the phase of the oscillation of the resonance circuit based on the drive signal and the oscillation of the resonance circuit detected by the oscillation detector. According to this structure, the phase difference can be detected utilizing the oscillation of the resonance circuit detected by the oscillation detector, and hence the phase difference between the phase of the drive signal and the phase of the oscillation of the resonance circuit can be easily detected.

The aforementioned wireless power supply device according to the first aspect preferably further includes a signal generation portion that generates a signal whose phase is deviated by about 90 degrees with respect to a phase corresponding to the drive timing of the drive signal and a phase difference detector that detects a phase difference between the phase of the signal generated by the signal generation portion and the phase of the oscillation of the resonance circuit, and the controller preferably substantially matches the phase of the drive signal and the phase of the oscillation of the resonance circuit by switching the direction of the current that flows into the coil based on the phase difference between the phase of the signal and the phase of the oscillation of the resonance circuit detected by the phase difference detector. In general, the phase difference between the phase of the signal deviated by about 90 degrees with respect to the phase corresponding to the drive timing of the drive signal and the phase of the oscillation of the resonance circuit is more easily acquired than the phase difference between the phase of the drive signal and the phase of the oscillation of the resonance circuit. Thus, the wireless power supply device is formed as described above, whereby the phase difference is more easily acquired, and the phase of the drive signal and the phase of the oscillation of the resonance circuit can be substantially matched.

In the aforementioned wireless power supply device according to the first aspect, the controller preferably substantially matches the phase of the drive signal and the phase of the oscillation of the resonance circuit by switching the direction of the current that flows into the coil to switch the direction of a magnetic field generated in the coil. According to this structure, in the structure of switching the direction of the current that flows into the coil to switch the direction of the magnetic field generated in the coil, a reduction in the efficiency of power transmission to the receiver resulting from the change of the resonant frequency of the resonance circuit in the power supply device can be significantly reduced or prevented while an increase in the size of the resonance circuit and complication of the structure of the resonance circuit are significantly reduced or prevented.

A wireless power supply system according to a second aspect of the present invention includes a receiver and a power supply device that wirelessly supplies power to the receiver, and the power supply device includes a resonance circuit including a coil and a capacitor, a power supply portion that supplies AC power to the resonance circuit based on a drive signal having a prescribed drive frequency, and a controller that substantially matches the phase of the drive signal and the phase of oscillation of the resonance circuit by switching the direction of a current that flows into the coil of the resonance circuit.

As hereinabove described, the wireless power supply system according to the second aspect of the present invention is provided with the controller that substantially matches the phase of the drive signal and the phase of the oscillation of the resonance circuit by switching the direction of the current that flows into the coil. Thus, also in the wireless power supply system according to the second aspect, a reduction in the efficiency of power transmission to the receiver resulting from change of the resonant frequency of the resonance circuit in the power supply device can be significantly reduced or prevented while an increase in the size of the resonance circuit and complication of the structure of the resonance circuit are significantly reduced or prevented, similarly to the case of the aforementioned wireless power supply device according to the first aspect.

In the aforementioned wireless power supply system according to the second aspect, the power supply device preferably further includes a phase difference detector that detects a phase difference between the phase of the drive signal and the phase of the oscillation of the resonance circuit, and the controller of the power supply device preferably substantially matches the phase of the drive signal and the phase of the oscillation of the resonance circuit by switching the direction of the current that flows into the coil based on the phase difference between the phase of the drive signal and the phase of the oscillation of the resonance circuit detected by the phase difference detector. According to this structure, even in the case where no signal generation portion that generates a signal for directly indicating the timing of switching the direction of the current that flows into the coil is provided, for example, a time point when the phase is deviated by about 90 degrees with respect to a phase corresponding to the drive timing of the drive signal can be indicated on the basis of the phase difference between the phase of the drive signal and the phase of the oscillation of the resonance circuit.

In the aforementioned wireless power supply system according to the second aspect, the resonance circuit of the power supply device is preferably formed such that a phase difference between the phase of the drive signal and the phase of the oscillation of the resonance circuit is less than about a quarter period. According to this structure, the phase difference between the phase of the drive signal and the phase of the oscillation of the resonance circuit is small, and hence the phase of the drive signal and the phase of the oscillation of the resonance circuit can be easily substantially matched.

In the aforementioned wireless power supply system according to the second aspect, the power supply device preferably further includes a signal generation portion that generates a signal whose phase is deviated by about 90 degrees with respect to a phase corresponding to the drive timing of the drive signal. According to this structure, a time point when the phase is deviated by about 90 degrees with respect to the phase corresponding to the drive timing of the drive signal can be easily determined by the signal generated by the signal generation portion.

A wireless power supply device according to a third aspect of the present invention includes a resonance circuit including a coil and a capacitor, a power supply portion that supplies AC power to the resonance circuit based on a drive signal having a prescribed drive frequency, and a controller that substantially matches the phase of the drive signal and the phase of oscillation of the resonance circuit by switching the direction of a magnetic field generated in the coil.

As hereinabove described, the wireless power supply device according to the third aspect of the present invention is provided with the controller that substantially matches the phase of the drive signal and the phase of the oscillation of the resonance circuit by switching the direction of the magnetic field generated in the coil. Thus, also in the wireless power supply device according to the third aspect, a reduction in the efficiency of power transmission to a receiver resulting from change of the resonant frequency of the resonance circuit in the power supply device can be significantly reduced or prevented while an increase in the size of the resonance circuit and complication of the structure of the resonance circuit are significantly reduced or prevented, similarly to the case of the aforementioned wireless power supply device according to the first aspect.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are hereinafter described with reference to the drawings.

First Embodiment

The structure of a wireless power supply system 100 according to a first embodiment of the present invention is now described with reference to FIG. 1.

Figure 1:
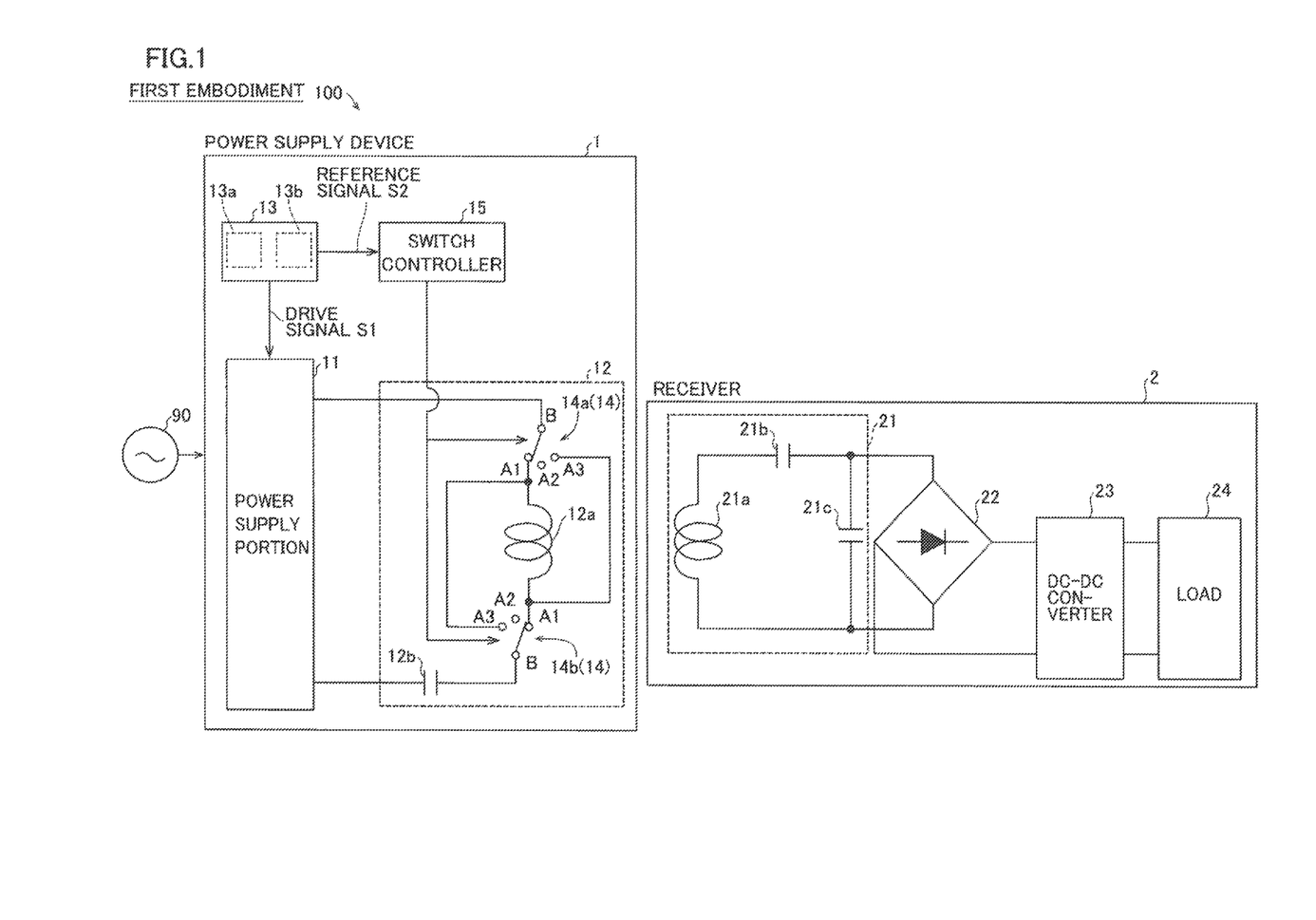
FIG. 1 illustrates the overall structure of a wireless power supply system according to a first embodiment of the present invention.

The wireless power supply system 100 according to the first embodiment of the present invention includes a power supply device 1 and a receiver 2, as shown in FIG. 1. The power supply device 1 is an example of the "wireless power supply device" in the claims.

In the wireless power supply system 100, the power supply device 1 and the receiver 2 are configured to wirelessly supply and receive power by a magnetic field resonance method. The wireless power supply system 100 is constituted by the power supply device 1 set on a dashboard of an automobile, a table of a commercial eating establishment, etc. for example and the receiver 2 as an electronic device (a smartphone or a digital camera, for example) capable of wirelessly receiving power. The aforementioned combination of the power supply device 1 and the receiver 2 is an example, and the wireless power supply system 100 may be constituted by a combination of a power supply device 1 and a receiver 2 other than the aforementioned combination.

As shown in FIG. 1, the power supply device 1 includes a power supply portion 11, a resonance circuit 12, a signal generation portion 13, a switch portion 14, and a switch controller 15. The switch controller 15 is an example of the "controller" in the claims.

The power supply portion 11 includes an unshown AC-DC converter and an unshown switching circuit and is configured to supply AC power supplied from a commercial power supply 90 to the resonance circuit 12 in a state where the AC power has been converted into AC power based on a drive signal S1 (see FIG. 2) having a prescribed drive frequency.

The resonance circuit 12 includes a power supply coil 12a and a resonance capacitor 12b. In the resonance circuit 12, the power supply coil 12a and the resonance capacitor 12b are connected in series to each other through a switch element 14b described later. The resonance circuit 12 is configured to generate a magnetic field for wirelessly supplying power to the receiver 2 by supply of the AC power based on the drive signal S1 from the power supply portion 11 to the power supply coil 12a. Thus, the power supply device 1 is configured to wirelessly supply power to the receiver 2 through the power supply coil 12a of the resonance circuit 12. The power supply coil 12a is an example of the "coil" in the claims. The resonance capacitor 12b is an example of the "capacitor" in the claims.

Figure 2:
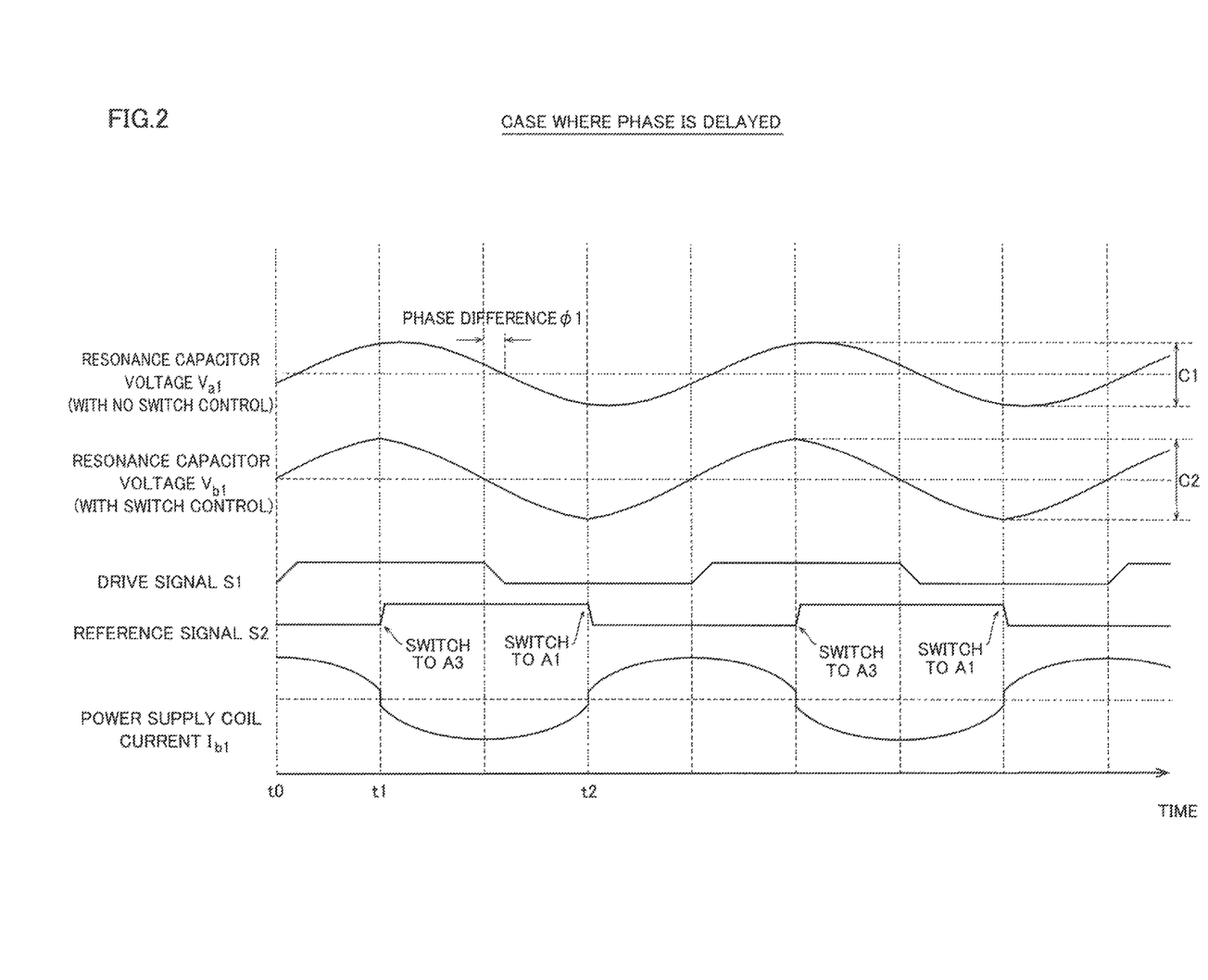
FIG. 2 illustrates voltage waveforms with switch control and with no switch control in the case where the phase is delayed in a power supply device according to the first embodiment of the present invention.
Figure 3:
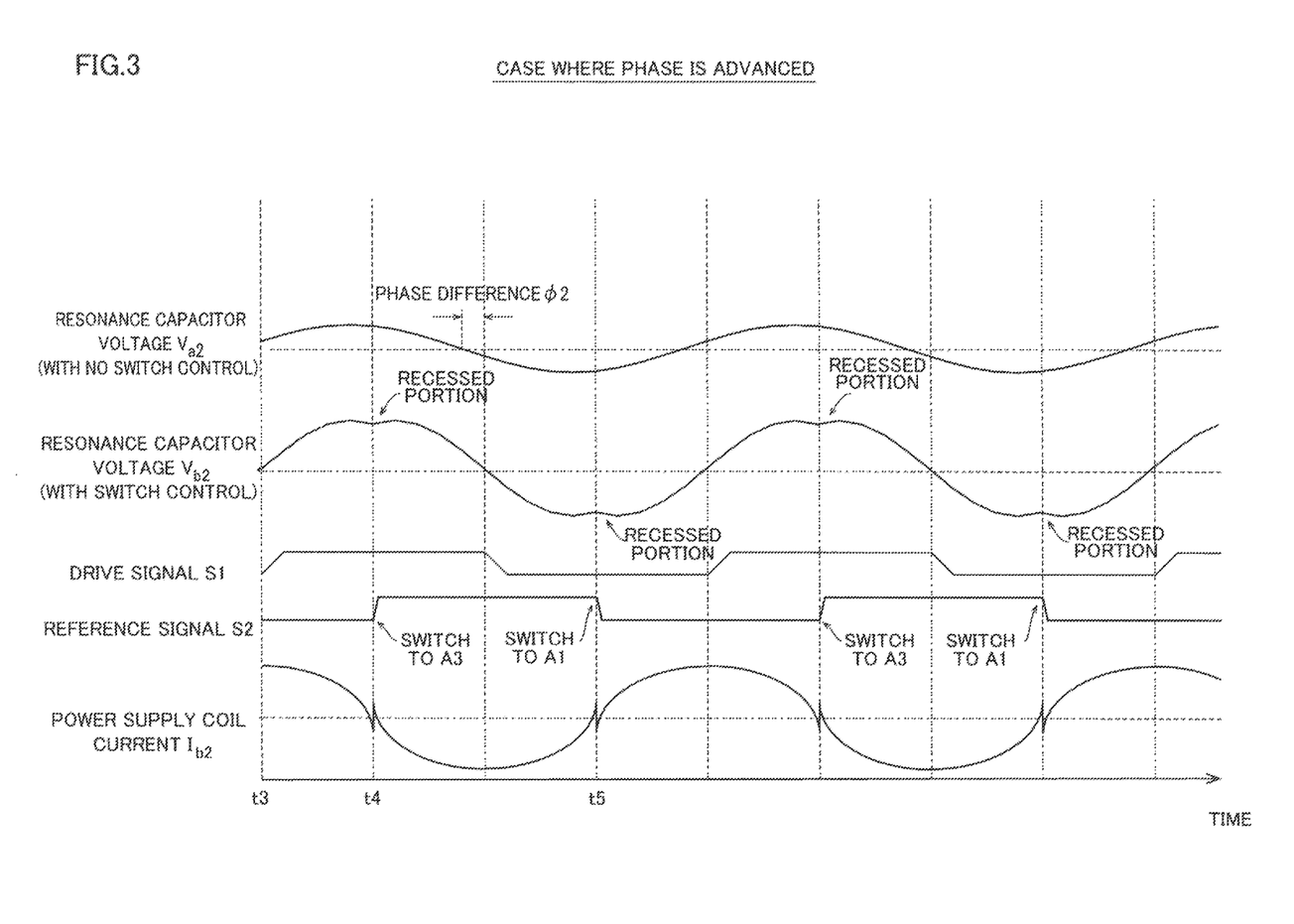
FIG. 3 illustrates voltage waveforms with switch control and with no switch control in the case where the phase is advanced in the power supply device according to the first embodiment of the present invention.

The resonance circuit 12 has a resonant frequency slightly deviated from (slightly larger or smaller than) the prescribed drive frequency. When the resonance circuit 12 has the resonant frequency slightly deviated from the prescribed drive frequency, the resonant frequency of the resonance circuit 12 may have been changed due to temporal change, usage environment, etc., for example. In this case, an AC voltage having substantially the same frequency as the prescribed drive frequency and a deviated (delayed or advanced) phase is generated in the resonance circuit 12, as shown in FIGS. 2 and 3. FIGS. 2 and 3 show the AC voltage generated in the resonance circuit 12 as the waveform of an AC voltage generated in the resonance capacitor 12b. The waveform of a resonance capacitor voltage $V_{a1}$ (see FIG. 2) is one when the phase is delayed, and the waveform of a resonance capacitor voltage $V_{a2}$ (see FIG. 3) is one when the phase is advanced. The phases of the resonance capacitor voltages $V_{a1}$ and $V_{a2}$ are examples of the "phase of oscillation of the resonance circuit" in the claims.

According to the first embodiment, the resonance circuit 12 is formed such that a phase difference between the phase of the drive signal S1 and the phase of the resonance capacitor voltage $V_{a1}$ (or $V_{a2}$) is less than about a quarter period (about 90 degrees), as shown in FIGS. 2 and 3. More specifically, in the case shown in FIG. 2, the resonance circuit 12 is formed such that delay of the phase of the resonance capacitor voltage $V_{a1}$ with respect to the phase of the drive signal S1 is less than about a quarter period, and in the case shown in FIG. 3, the resonance circuit 12 is formed such that advance of the phase of the resonance capacitor voltage $V_{a2}$ with respect to the phase of the drive signal S1 is less than about a quarter period.

The signal generation portion 13 has oscillators 13a and 13b. The oscillator 13a is configured to generate a substantially rectangular wave-shaped drive signal S1 having a prescribed drive frequency and to output the generated drive signal S1 to the power supply portion 11. The oscillator 13b is configured to generate a reference signal S2 whose phase is deviated by about 90 degrees with respect to a phase corresponding to the drive timing (the timing of the rising or falling edge) of the substantially rectangular wave-shaped drive signal S1 and to output the generated reference signal S2 to the switch controller 15. The reference signal S2 is a substantially rectangular wave-shaped signal having substantially the same frequency as that of the drive signal S1.

The switch portion 14 includes switch elements 14a and 14b. The switch elements 14a and 14b each are constituted of a semiconductor switch or a relay switch, for example. In addition, the switch elements 14a and 14b each include a terminal B and three switch terminals A1, A2, and A3. In the switch element 14a, the terminal B is connected to the power supply portion 11, and the switch terminal A1 is connected to a first end of the power supply coil 12a. Furthermore, in the switch element 14a, the switch terminal A2 is not connected to any element, but the switch terminal A3 is connected to a second end of the power supply coil 12a. In the switch element 14b, the terminal B is connected to an electrode on one side of the resonance capacitor 12b, and the switch terminal A1 is connected to the second end of the power supply coil 12a. Furthermore, in the switch element 14b, the switch terminal A2 is not connected to any element, but the switch terminal A3 is connected to the first end of the power supply coil 12a. The switch elements 14a and 14b are examples of the "first switch element" and the "second switch element" in the claims, respectively.

The switch controller 15 includes a microcomputer and is configured to switch between the switch elements 14a and 14b of the switch portion 14 and switch the connection states of the switch elements 14a and 14b by outputting a switch control signal to the switch elements 14a and 14b individually. The switch controller 15 is configured to switch the connection states of the switch elements 14a and 14b in conjunction with each other.

According to the first embodiment, the switch controller 15 is configured to switch the direction of a current that flows into the power supply coil 12a of the resonance circuit 12 by switching between the switch elements 14a and 14b. Thus, the direction of the magnetic field generated in the power supply coil 12a is switched according to the direction of the current that flows into the power supply coil 12a.

Specifically, the switch controller 15 is configured to switch the direction (the direction of a magnetic field) of the current that flows into the power supply coil 12a of the resonance circuit 12 to an opposite direction by switching between a first path in which each of the switch elements 14a and 14b makes a connection between the terminal B and the switch terminal A1 (hereinafter referred to as between B and A1) and a second path in which each of the switch elements 14a and 14b makes a connection between the terminal B and the switch terminal A3 (hereinafter referred to as between B and A3). The first path is a path allowing a current to flow into the power supply coil 12a from a prescribed direction. The second path is a path allowing a current to flow into the power supply coil 12a from a direction opposite to the prescribed direction.

Furthermore, dead time (time for significantly reducing or preventing the possibility that one of the switch elements 14a and 14b makes a connection between B and A1 while the other of the switch elements 14a and 14b makes a connection between B and A3) is provided when a connection state between B and A1 and a connection state between B and A3 are switched, whereby a connection state between the terminal B and the switch terminal A2 is utilized to prevent a short circuit. Thus, malfunction resulting from a short circuit can be significantly reduced or prevented when the direction of the current that flows into the power supply coil 12a is switched.

According to the first embodiment, the switch controller 15 is configured to control the switch portion 14 to switch the direction of the current that flows into the power supply coil 12a upon deviation of the phase by about 90 degrees with respect to the phase corresponding to the drive timing of the drive signal S1 (i.e. at a time point corresponding to the rising or falling edge of the reference signal S2) on the basis of (based on) the reference signal S2 generated by the oscillator 13b of the signal generation portion 13. Thus, the switch controller 15 is configured to substantially match the phase of the drive signal S1 and the phase of a resonance capacitor voltage as resonance capacitor voltages $V_{b1}$ and $V_{b2}$ in FIGS. 2 and 3. This control of the switch portion 14 performed by the switch controller 15 is described in detail later.

As shown in FIG. 1, the receiver 2 includes a resonance circuit 21, a rectifier circuit 22, a DC-DC converter 23, and a load 24.

The resonance circuit 21 includes a power receiving coil 21a, a series resonance capacitor 21b, and a parallel resonance capacitor 21c. The series resonance capacitor 21b and the parallel resonance capacitor 21c are connected in series and in parallel to the power receiving coil 21a, respectively. The resonance circuit 21 is configured to resonate at substantially the same resonant frequency as the prescribed drive frequency of the drive signal S1 of the power supply device 1.

In the resonance circuit 21, the power receiving coil 21a is configured to wirelessly receive power by the magnetic field generated in the power supply coil 12a of the resonance circuit 12 of the power supply device 1. In this case, AC power having substantially the same frequency as the resonant frequency of the resonance circuit 21 is generated in the resonance circuit 12.

The rectifier circuit 22 is constituted of a bridge rectifier circuit and is configured to rectify the AC power generated in the resonance circuit 21 to DC power. The rectifier circuit 22 is configured to supply the rectified DC power to the DC-DC converter 23.

The DC-DC converter 23 is configured to raise or lower the voltage value of the DC power supplied from the rectifier circuit 22 to a prescribed voltage value and to supply the power to the load 24.

The load 24 includes a rechargeable secondary battery. The load 24 as the secondary battery is configured to be charged with the power supplied from the DC-DC converter 23. The load 24 may include a load other than the rechargeable secondary battery. The load 24 may include a circuit that directly operates by the power supplied from the DC-DC converter 23, for example.

The control of the switch portion 14 performed by the switch controller 15 of the power supply device 1 is now described with reference to FIG. 2. FIG. 2 illustrates the case where the resonance circuit 12 has a resonant frequency smaller than the prescribed drive frequency.

In this case, an AC voltage having the waveform of the resonance capacitor voltage $V_{a1}$ whose phase is delayed by a phase difference $\phi 1$ with respect to the phase of the drive signal S1 is generated in the resonance capacitor 12b when the switch controller 15 does not control the switch portion 14, as shown in FIG. 2. The phase difference $\phi 1$ is less than about a quarter period (about 90 degrees).

When the switch controller 15 does not control the switch portion 14, the resonant frequency of the resonance circuit 21 of the receiver 2 substantially equal to the prescribed drive frequency and the resonant frequency of the resonance circuit 12 of the power supply device 1 are not substantially matched.

When the switch controller 15 controls the switch portion 14, on the other hand, the resonance capacitor voltage $V_{a1}$ is adjusted to an AC voltage having the waveform of the resonance capacitor voltage $V_{b1}$ whose phase is substantially matched with the phase of the drive signal S1. The adjustment of the waveform of the AC voltage generated in the resonance circuit 12 by the switch controller 15 is now described in detail.

It is assumed that a current flows into the power supply coil 12a through the first path in which each of the switch elements 14a and 14b makes a connection between B and A1 at a time point t0. As shown by the waveform of a power supply coil current $I_{b1}$ in FIG. 2, a current for supplying power to (charging) the resonance capacitor 12b flows into the power supply coil 12a through the first path from the time point t0. Thus, as shown by the waveform of the resonance capacitor voltage $V_{b1}$ in FIG. 2, power is supplied to the resonance capacitor 12b (the resonance capacitor 12b is charged), and the voltage value of the resonance capacitor 12b is gradually raised.

At a time point t1 when the phase is deviated by about 90 degrees with respect to a phase corresponding to the drive timing of the rising edge of the drive signal S1, the switch controller 15 switches both the switch elements 14a and 14b from the connection state between B and A1 to the connection state between B and A3. Thus, the path of the current that flows into the power supply coil 12a is switched from the first path to the second path, and the direction of the current that flows into the power supply coil 12a is forced to be opposite. Consequently, the resonance capacitor 12b starts to be discharged, and hence the waveform is changed in a direction of forcibly changing from rising to falling at the time point t1, as shown by the waveform of the resonance capacitor $V_{b1}$ in FIG. 2. When the switch controller 15 does not control the switch portion 14, the voltage value of the resonance capacitor 12b changes from rising to falling at a time point slightly posterior to the time point t1, as shown by the waveform of the resonance capacitor $V_{a1}$ in FIG. 2. More specifically, the phase of the resonance capacitor voltage $V_{a1}$ is adjusted by a degree corresponding to a change of this time point when the voltage value of the resonance capacitor 12b changes from rising to falling in a phase-advance direction.

At a time point t2 when the phase is deviated by about 90 degrees with respect to a phase corresponding to the drive timing of the falling edge of the drive signal S1, the switch controller 15 now switches both the switch elements 14a and 14b from the connection state between B and A3 to the connection state between B and A1. Thus, the path of the current that flows into the power supply coil 12a is now switched from the second path to the first path, and the direction of the current that flows into the power supply coil 12a is forced to be opposite again. Consequently, the resonance capacitor 12b starts to be discharged, and hence the waveform is changed in a direction of forcibly changing from falling to rising at the time point t2, as shown by the waveform of the resonance capacitor $V_{b1}$ in FIG. 2. When the switch controller 15 does not control the switch portion 14, the voltage value of the resonance capacitor 12b changes from falling to rising at a time point slightly posterior to the time point t2, as shown by the waveform of the resonance capacitor $V_{a1}$ in FIG. 2. More specifically, the phase of the resonance capacitor voltage $V_{a1}$ is adjusted by a degree corresponding to a change of this time point when the voltage value of the resonance capacitor 12b changes from falling to rising in the phase-advance direction.

Subsequently, the switch controller 15 controls the switch portion 14 periodically at a time point when the phase is deviated by about 90 degrees with respect to the phase corresponding to the drive timing (rising or falling edge) of the drive signal S1. This adjustment of the waveform results in that the amplitude C2 of the waveform of the resonance capacitor voltage $V_{b1}$ after adjustment becomes larger than the amplitude C1 of the waveform of the resonance capacitor voltage $V_{a1}$ before adjustment, as shown in FIG. 2.

Consequently, when the switch controller 15 controls the switch portion 14, the waveform of the resonance capacitor voltage $V_{a1}$ whose phase is delayed by the phase difference ϕ1 with respect to the phase of the drive signal S1 can be adjusted to the waveform of the resonance capacitor voltage $V_{b1}$ whose phase is substantially matched with the phase of the drive signal S1.

It is known that the phase of the drive signal S1 is deviated from the phase of the AC voltage generated in the resonance circuit 12 when the drive frequency of the drive signal S1 is different from the resonant frequency of the resonance circuit 12, and the phase of the drive signal S1 and the phase of the AC voltage generated in the resonance circuit 12 are substantially matched when the drive frequency of the drive signal S1 and the resonant frequency of the resonance circuit 12 are substantially matched.

Therefore, it can be considered that the resonant frequency of the resonance circuit 21 of the receiver 2 substantially equal to the prescribed drive frequency and the resonant frequency of the resonance circuit 12 of the power supply device 1 are substantially matched when the switch controller 15 controls the switch portion 14.

The control of the switch portion 14 performed by the switch controller 15 of the power supply device 1 is now described with reference to FIG. 3. FIG. 3 illustrates the case where the resonance circuit 12 has a resonant frequency larger than the prescribed drive frequency.

In this case, an AC voltage having the waveform of the resonance capacitor voltage $V_{a2}$ whose phase is advanced by a phase difference ϕ2 with respect to the phase of the drive signal S1 is generated in the resonance capacitor 12b when the switch controller 15 does not control the switch portion 14, as shown in FIG. 3. The phase difference ϕ2 is less than about a quarter period (about 90 degrees).

It is assumed that a current flows into the power supply coil 12a through the first path in which each of the switch elements 14a and 14b makes a connection between B and A1 at a time point t3. As shown by the waveform of a power supply coil current $I_{b2}$ in FIG. 3, a current for supplying power to (charging) the resonance capacitor 12b flows into the power supply coil 12a from the time point t3. Thus, as shown by the waveform of the resonance capacitor voltage $V_{b1}$ in FIG. 2, power is supplied to the resonance capacitor 12b (the resonance capacitor 12b is charged), and the voltage value of the resonance capacitor 12b is gradually raised while the voltage value of the resonance capacitor 12b changes from rising to falling at a time point prior to a time point t4.

At the time point t4 when the phase is deviated by about 90 degrees with respect to the phase corresponding to the drive timing of the rising edge of the drive signal S1, the switch controller 15 switches both the switch elements 14a and 14b from the connection state between B and A1 to the connection state between B and A3. Thus, the path of the current that flows into the power supply coil 12a is switched from the first path to the second path, and the direction of the current that flows into the power supply coil 12a is forced to be opposite. Consequently, the discharged resonance capacitor 12b starts to be supplied with power (charged), and hence the waveform is changed in the direction of forcibly changing from falling to rising at the time point t4, as shown by the waveform of the resonance capacitor $V_{b2}$ in FIG. 2. Then, the voltage value of the resonance capacitor 12b is gradually raised from the time point t4, changes from rising to falling again, and thereafter is gradually lowered. At a time point prior to a time point t5, the voltage value of the resonance capacitor 12b changes from falling to rising.

At the time point t5 when the phase is deviated by about 90 degrees with respect to the phase corresponding to the drive timing of the falling edge of the drive signal S1, the switch controller 15 now switches both the switch elements 14a and 14b from the connection state between B and A3 to the connection state between B and A1. Thus, the path of the current that flows into the power supply coil 12a is now switched from the second path to the first path, and the direction of the current that flows into the power supply coil 12a is forced to be opposite again. Consequently, the discharged resonance capacitor 12b starts to be supplied with power, and hence the waveform is changed in the direction of forcibly changing from rising to falling at the time point t5, as shown by the waveform of the resonance capacitor $V_{b2}$ in FIG. 2. Then, the voltage value of the resonance capacitor 12b is gradually raised from the time point t5, changes from falling to rising again, and thereafter is gradually raised. Subsequently, the switch controller 15 controls the switch portion 14 periodically at a time point when the phase is deviated by about 90 degrees with respect to the phase corresponding to the drive timing (rising or falling edge) of the drive signal S1.

Consequently, when the switch controller 15 controls the switch portion 14, the waveform of the resonance capacitor voltage $V_{a2}$ whose phase is advanced by the phase difference φ2 with respect to the phase of the drive signal S1 can be adjusted to the waveform of the resonance capacitor voltage $V_{b2}$ whose phase is substantially matched with the phase of the drive signal S1. In the waveform of the resonance capacitor voltage $V_{b2}$ after adjustment, a recessed portion is generated at a time point when the phase is deviated by about 90 degrees with respect to the phase corresponding to the drive timing of the drive signal S1. Also in the case of this waveform, it can be considered that the resonant frequency of the resonance circuit 21 of the receiver 2 substantially equal to the prescribed drive frequency and the resonant frequency of the resonance circuit 12 of the power supply device 1 are substantially matched.

According to the first embodiment, the following effects can be obtained.

According to the first embodiment, as hereinabove described, the power supply device 1 is provided with the switch controller 15 that substantially matches the phase of the drive signal S1 and the phase of oscillation (resonance capacitor voltages $V_{a1}$ and $V_{a2}$) of the resonance circuit 12 by switching the direction of the current that flows into the power supply coil 12a. Thus, the oscillation (oscillatory waveform) of the resonance circuit 12 can be forcibly changed in the direction of changing from rising to falling or the direction of changing from falling to rising in correspondence to forcible switching of the direction of the current that flows into the power supply coil 12a by the switch controller 15. Consequently, even when the resonant frequency of the resonance circuit 12 is changed due to temporal change, usage environment, etc., the drive frequency (the resonant frequency of the resonance circuit 21 of the receiver 2) of the drive signal S1 and the resonant frequency of the resonance circuit 12 (the phase of the drive signal S1 and the phase of the oscillation generated in the resonance circuit 12) can be virtually substantially matched. Therefore, the change of the resonant frequency of the resonance circuit 12 resulting from temporal change, usage environment, etc. can be adjusted, and hence a reduction in the efficiency of power transmission to the receiver 2 resulting from the change of the resonant frequency of the resonance circuit 12 in the power supply device 1 can be significantly reduced or prevented. Furthermore, a plurality of capacitors may not be provided to adjust the change of the resonant frequency of the resonance circuit 12 resulting from temporal change, usage environment, etc., and hence an increase in the size of the resonance circuit 12 and complication of the structure of the resonance circuit 12 can be significantly reduced or prevented. Consequently, a reduction in the efficiency of power transmission to the receiver 2 resulting from the change of the resonant frequency of the resonance circuit 12 in the power supply device 1 can be significantly reduced or prevented while an increase in the size of the resonance circuit 12 and complication of the structure of the resonance circuit 12 are significantly reduced or prevented.

In the power supply device 1 of the wireless power supply system 100, the resonant frequency of the resonance circuit 12 is generally adjusted at the time of manufacturing (before shipment). Specifically, parameters of the power supply coil 12 and the resonance capacitor 12b of the resonance circuit 12 are adjusted, whereby the resonant frequency of the resonance circuit 12 is adjusted such that the drive frequency of the drive signal S1 and the resonant frequency of the resonance circuit 12 are substantially matched. It takes thousands of man-hours to adjust the resonant frequency of the resonance circuit 12 at the time of manufacturing, and hence the productivity of the power supply device 1 is disadvantageously reduced. According to the first embodiment, the power supply device 1 is formed as described above, whereby this disadvantage can be also resolved. More specifically, even if the resonant frequency of the resonance circuit 12 is not adjusted at the time of manufacturing such that the drive frequency of the drive signal S1 and the resonant frequency of the resonance circuit 12 are substantially matched, the drive frequency of the drive signal S1 and the resonant frequency of the resonance circuit 12 can be virtually substantially matched at the time of use. Thus, a reduction in the productivity of the power supply device 1 can be significantly reduced or prevented by saving the trouble of adjusting the resonant frequency of the resonance circuit 12.

According to the first embodiment, as hereinabove described, the power supply device 1 is provided with the signal generation portion 13 that generates the reference signal S2 whose phase is deviated by about 90 degrees with respect to the phase corresponding to the drive timing of the drive signal S1. Thus, a time point when the phase is deviated by about 90 degrees with respect to the phase corresponding to the drive timing of the drive signal S1 can be easily determined by the reference signal S2 generated by the signal generation portion 13.

According to the first embodiment, as hereinabove described, the switch controller 15 is configured to substantially match the phase of the drive signal S1 and the phase of the oscillation of the resonance circuit 12 by switching the direction of the current that flows into the power supply coil 12a at the time point when the phase is deviated by about 90 degrees with respect to the phase corresponding to the drive timing of the drive signal S1 on the basis of (based on) the reference signal S2 generated by the signal generation portion 13. In the ideal case where the drive frequency of the drive signal S1 and the resonant frequency of the resonance circuit 12 are substantially matched, the oscillation (oscillatory waveform) of the resonance circuit 12 changes from rising to falling or from falling to rising at the time point when the phase is deviated by about 90 degrees with respect to the phase corresponding to the drive timing of the drive signal S1. Thus, the power supply device 1 is formed as described above, whereby when the resonant frequency is changed, the oscillation (oscillatory waveform) of the resonance circuit 12 can be easily changed in the direction of changing from rising to falling or changing from falling to rising at a time point when the oscillation (oscillatory waveform) of the resonance circuit 12 changes from rising to falling or from falling to rising in the ideal case. Therefore, when the resonant frequency is changed, the oscillation (i.e. the resonance capacitor voltages $V_{a1}$ or $V_{a2}$) of the resonance circuit 12 can be easily changed to the oscillation (i.e. the resonance capacitor voltages $V_{b1}$ or $V_{b2}$) of the resonance circuit 12 in the ideal case.

According to the first embodiment, as hereinabove described, the signal generation portion 13 is configured to generate the substantially rectangular wave-shaped reference signal S2. Furthermore, the switch controller 15 is configured to switch the direction of the current that flows into the power supply coil 12a at the time point corresponding to the rising or falling edge of the reference signal S2. Thus, the time point when the phase is deviated by about 90 degrees with respect to the phase corresponding to the drive timing of the drive signal S1 can be more easily determined as the time point corresponding to the rising or falling edge of the rectangular wave-shaped reference signal S2.

According to the first embodiment, as hereinabove described, the power supply device 1 is provided with the switch portion 14 that switches the direction of the current that flows into the power supply coil 12a of the resonance circuit 12. Thus, the direction of the current that flows into the power supply coil 12a of the resonance circuit 12 can be easily switched while an increase in the size of the resonance circuit 12 and complication of the structure of the resonance circuit 12 are significantly reduced or prevented due to the simple structure.

According to the first embodiment, as hereinabove described, the resonance circuit 12 includes the first path allowing a current to flow into the power supply coil 12a from the prescribed direction and the second path allowing a current to flow into the power supply coil 12a from the direction opposite to the prescribed direction. Thus, the direction of the current that flows into the power supply coil 12a of the resonance circuit 12 can be easily switched by the first path and the second path.

According to the first embodiment, as hereinabove described, the switch portion 14 is configured to switch the direction of the current that flows into the power supply coil 12a of the resonance circuit 12 by switching the path of the current that flows into the power supply coil 12a to either the first path or the second path. Thus, the switch portion 14 can easily switch the direction of the current that flows into the power supply coil 12a of the resonance circuit 12 by switching between the first path and the second path.

According to the first embodiment, as hereinabove described, the switch portion 14 includes the switch element 14a connected to the first end of the power supply coil 12a and the switch element 14b connected to the second end of the power supply coil 12a. Furthermore, the switch portion 14 is configured to switch the path of the current that flows into the power supply coil 12a to either the first path or the second path by the switch elements 14a and 14b. Thus, the first path and the second path are easily switched by the switch elements 14a and 14b, whereby the direction of the current that flows into the power supply coil 12a of the resonance circuit 12 can be easily switched.

According to the first embodiment, as hereinabove described, the controller is the switch controller 15 that substantially matches the phase of the drive signal S1 and the phase of the oscillation of the resonance circuit 12 by controlling the switch elements 14a and 14b. Thus, the switch controller 15 can easily substantially match the phase of the drive signal S1 and the phase of the oscillation of the resonance circuit 12 by controlling the switch elements 14a and 14b.

According to the first embodiment, as hereinabove described, the switch elements 14a and 14b each include a semiconductor switch element. Thus, the switch elements 14a and 14b can be driven at a relatively high speed, and hence the first path and the second path can be switched at a relatively high speed.

According to the first embodiment, as hereinabove described, the switch controller 15 is configured to substantially match the phase of the drive signal S1 and the phase of the oscillation of the resonance circuit 12 by switching the direction of the current that flows into the power supply coil 12a to switch the direction of the magnetic field generated in the power supply coil 12a. Thus, in the structure of switching the direction of the current that flows into the power supply coil 12a to switch the direction of the magnetic field generated in the power supply coil 12a, a reduction in the efficiency of power transmission to the receiver 2 resulting from the change of the resonant frequency of the resonance circuit 12 in the power supply device 1 can be significantly reduced or prevented while an increase in the size of the resonance circuit 12 and complication of the structure of the resonance circuit 12 are significantly reduced or prevented.

Second Embodiment

A second embodiment is now described with reference to FIGS. 4 and 5. In this second embodiment, a switch portion 14 switches the direction of a current that flows into a power supply coil 12a at a time point based on a phase difference $\phi 3$ between the phase of a drive signal S1 and the phase of an AC voltage generated in a resonance circuit 12, unlike the first embodiment in which the switch portion 14 switches the direction of the current that flows into the power supply coil 12a at the time point based on the reference signal S2 generated by the signal generation portion 13. Portions of a wireless power supply system 200 similar to those of the wireless power supply system 100 according to the aforementioned first embodiment are denoted by the same reference numerals, to omit the description.

Figure 4:
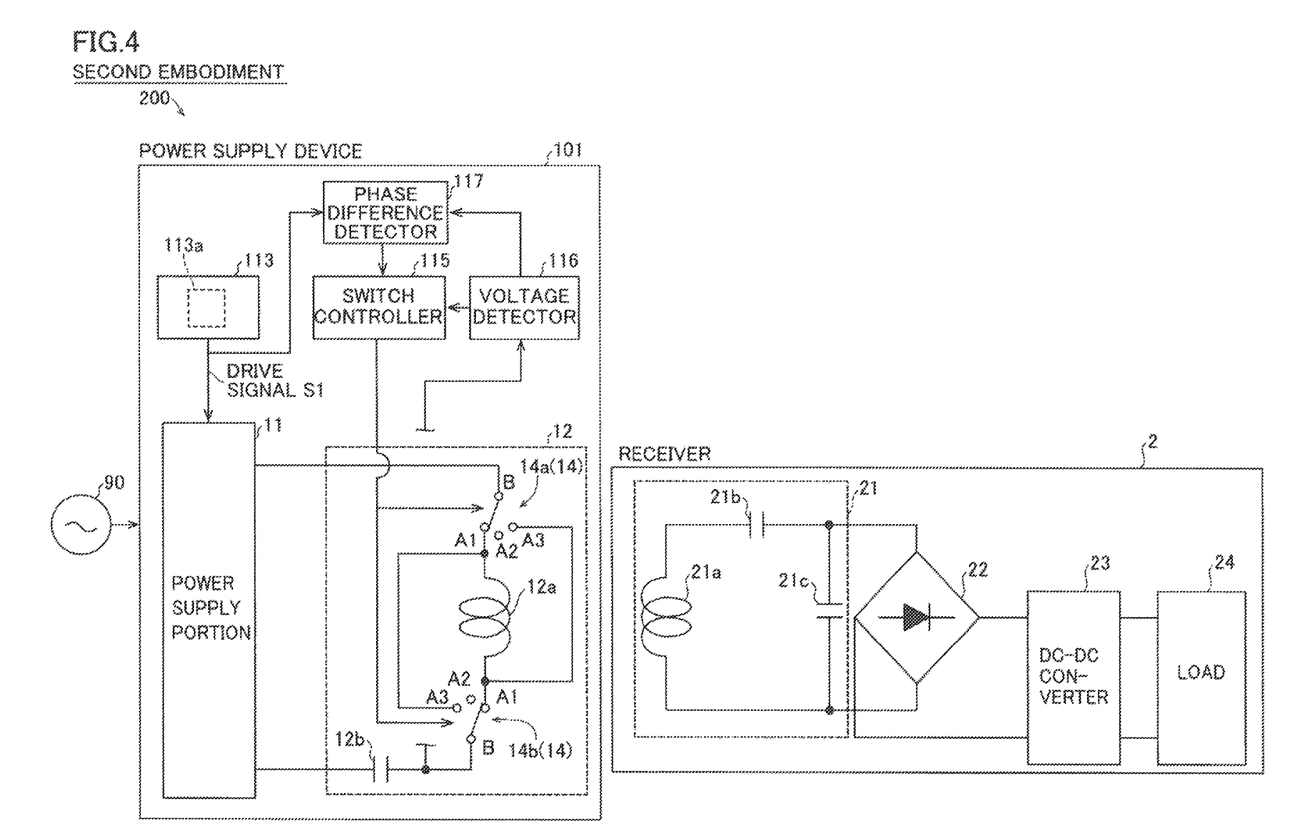
FIG. 4 illustrates the overall structure of a wireless power supply system according to a second embodiment of the present invention.

As shown in FIG. 4, the wireless power supply system 200 according to the second embodiment of the present invention includes a power supply device 101. The power supply device 101 includes a signal generation portion 113, a switch controller 115, a voltage detector 116, and a phase difference detector 117. The power supply device 101 is an example of the "wireless power supply device" in the claims. The switch controller 115 is an example of the "controller" in the claims. The voltage detector 116 is an example of the "oscillation detector" in the claims.

According to the second embodiment, the signal generation portion 113 includes an oscillator 113a that generates the drive signal S1 but not an oscillator 13b that generates a reference signal S2. The oscillator 113a is configured to output the generated drive signal S1 to a power supply portion 11 and the phase difference detector 117.

Figure 5:
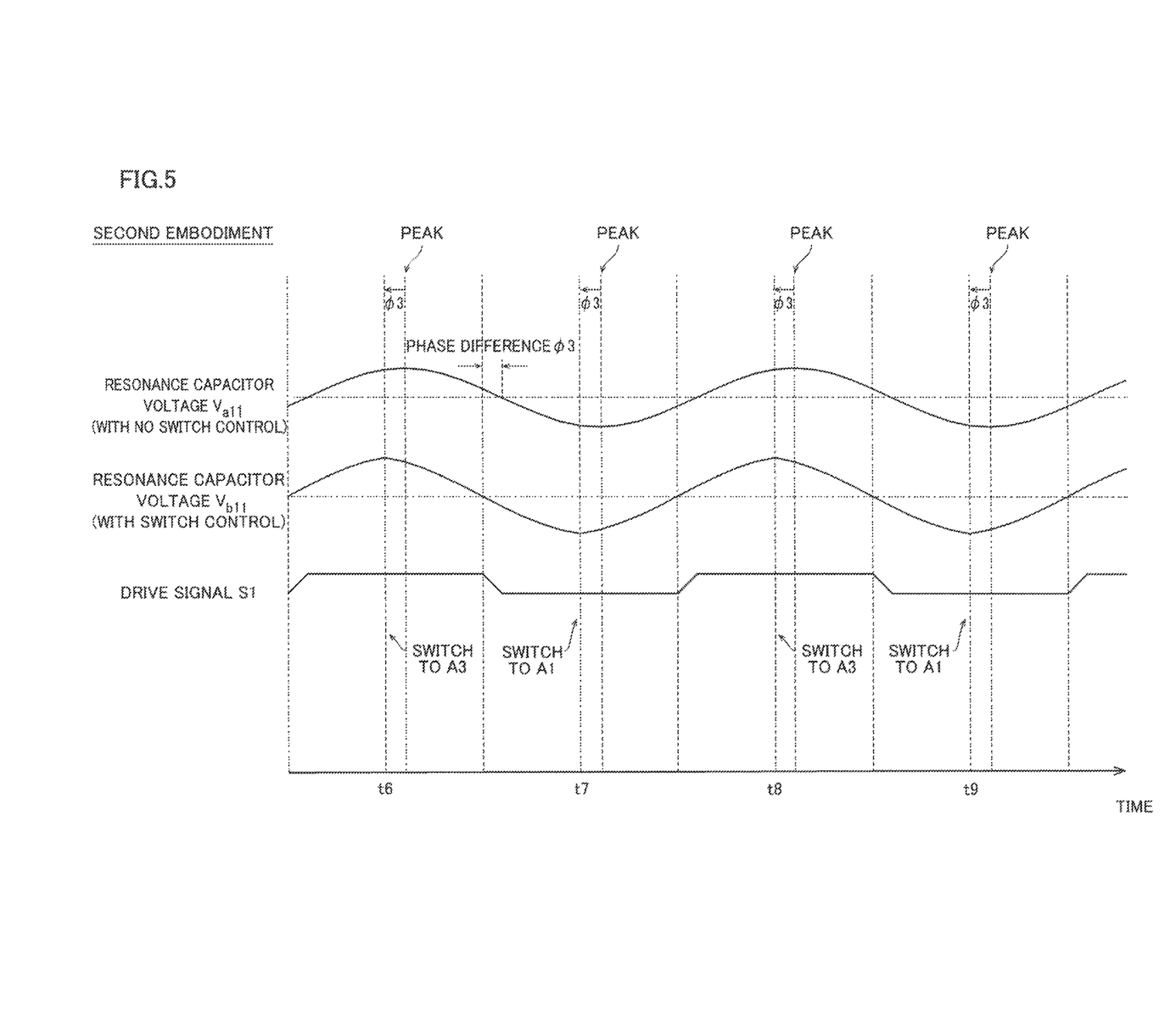
FIG. 5 illustrates a phase difference between the phase of a drive signal and the phase of a voltage waveform of a resonance circuit in a power supply device according to the second embodiment of the present invention.

The voltage detector 116 is configured to detect the AC voltage generated in the resonance capacitor 12b as the waveform of a resonance capacitor voltage $V_{a11}$ shown in FIG. 5. The voltage detector 116 is configured to output the detected waveform to the switch controller 115 and the phase difference detector 117. The phase of the resonance capacitor voltage $V_{a11}$ is an example of the "phase of oscillation of the resonance circuit" in the claims.

The phase difference detector 117 is configured to detect the phase difference φ3 between the phase of the drive signal S1 and the phase of the resonance capacitor voltage $V_{a11}$ on the basis of (based on) the drive signal S1 and the waveform detected by the voltage detector 116. The phase difference detector 117 is configured to output the detected phase difference φ3 to the switch controller 115.

According to the second embodiment, the switch controller 115 is configured to acquire a time point when the phase is deviated by about 90 degrees with respect to a phase corresponding to the drive timing of the drive signal S1 on the basis of the phase difference φ3 detected by the phase difference detector 117. Specifically, the switch controller 115 is configured to acquire the time point when the phase is deviated by about 90 degrees with respect to the phase corresponding to the drive timing of the drive signal S1 by acquiring a plurality of time points t6, t7, t8, t9, . . . advanced by the phase difference φ3 from the peaks (time points of changing from rising to falling or from falling to rising) of the waveform of the resonance capacitor voltage $V_{a11}$ detected by the voltage detector 116.

The switch controller 115 is configured to control the switch portion 14 to switch the direction of the current that flows into the power supply coil 12a at the acquired time point when the phase is deviated by about 90 degrees with respect to the phase corresponding to the drive timing of the drive signal S1. Thus, the switch controller 115 is configured to substantially match the phase of the drive signal S1 and the phase of a resonance capacitor voltage as a resonance capacitor voltage $V_{b11}$ in FIG. 5. In the second embodiment, only the waveform (resonance capacitor voltage $V_{a11}$) whose phase is delayed with respect to the phase of the drive signal S1 is shown, but the phase can be substantially matched with the phase of the drive signal S1 similarly to the aforementioned first embodiment also in the case of the waveform whose phase is advanced.

The remaining structure of the wireless power supply system 200 according to the second embodiment is similar to that of the wireless power supply system 100 according to the first embodiment.

According to the second embodiment, the following effects can be obtained.

According to the second embodiment, as hereinabove described, the power supply device 101 is provided with the switch controller 115 that substantially matches the phase of the drive signal S1 and the phase of oscillation (resonance capacitor voltage $V_{a11}$) of the resonance circuit 12 by switching the direction of the current that flows into the power supply coil 12a. Thus, a reduction in the efficiency of power transmission to a receiver 2 resulting from change of the resonant frequency of the resonance circuit 12 in the power supply device 101 can be significantly reduced or prevented while an increase in the size of the resonance circuit 12 and complication of the structure of the resonance circuit 12 are significantly reduced or prevented, similarly to the aforementioned first embodiment.

According to the second embodiment, as hereinabove described, the power supply device 101 is provided with the phase difference detector 117 that detects the phase difference φ3 between the phase of the drive signal S1 and the phase of the oscillation of the resonance circuit 12. Furthermore, the switch controller 115 is configured to substantially match the phase of the drive signal S1 and the phase of the oscillation of the resonance circuit 12 by switching the direction of the current that flows into the power supply coil 12a on the basis of (based on) the phase difference φ3 between the phase of the drive signal S1 and the phase of the oscillation of the resonance circuit 12 detected by the phase difference detector 117. Thus, even in the case where no oscillator 13b of a signal generation portion 13 that generates a signal for directly indicating the timing of switching the direction of the current that flows into the power supply coil 12a is provided, for example, the timing of switching the direction of the current that flows into the power supply coil 12a (the time point when the phase is deviated by about 90 degrees with respect to the phase corresponding to the drive timing of the drive signal S1) can be indicated on the basis of the phase difference φ3 between the phase of the drive signal S1 and the phase of the oscillation of the resonance circuit 12. Consequently, even in the case where no oscillator 13b of the signal generation portion 13 that generates the signal for directly indicating the timing of switching the direction of the current that flows into the power supply coil 12a is provided, the phase of the drive signal S1 and the phase of the oscillation of the resonance circuit 12 can be substantially matched.

According to the second embodiment, as hereinabove described, the power supply device 101 is provided with the voltage detector 116 that detects the oscillation of the resonance circuit 12. Furthermore, the phase difference detector 117 is configured to detect the phase difference φ3 between the phase of the drive signal S1 and the phase of the oscillation of the resonance circuit 12 on the basis of (based on) the drive signal S1 and the oscillation of the resonance circuit 12 detected by the voltage detector 116. Thus, the phase difference φ3 can be detected utilizing the oscillation of the resonance circuit 12 detected by the voltage detector 116, and hence the phase difference φ3 between the phase of the drive signal S1 and the phase of the oscillation of the resonance circuit 12 can be easily detected.

The remaining effects of the second embodiment are similar to those of the aforementioned first embodiment.

Third Embodiment

A third embodiment is now described with reference to FIGS. 6 and 7. In this third embodiment, a switch portion 14 switches the direction of a current that flows into a power supply coil 12a at a time point based on a phase difference φ4 between the phase of a reference signal S22 and the phase of an AC voltage generated in a resonance circuit 12, unlike the second embodiment in which the switch portion 14 switches the direction of the current that flows into the power supply coil 12a at the time point based on the phase difference φ3 between the phase of the drive signal S1 and the phase of the AC voltage generated in the resonance circuit 12. Portions of a wireless power supply system 300 similar to those of the wireless power supply systems 100 and 200 according to the aforementioned first and second embodiments are denoted by the same reference numerals, to omit the description.

Figure 6:
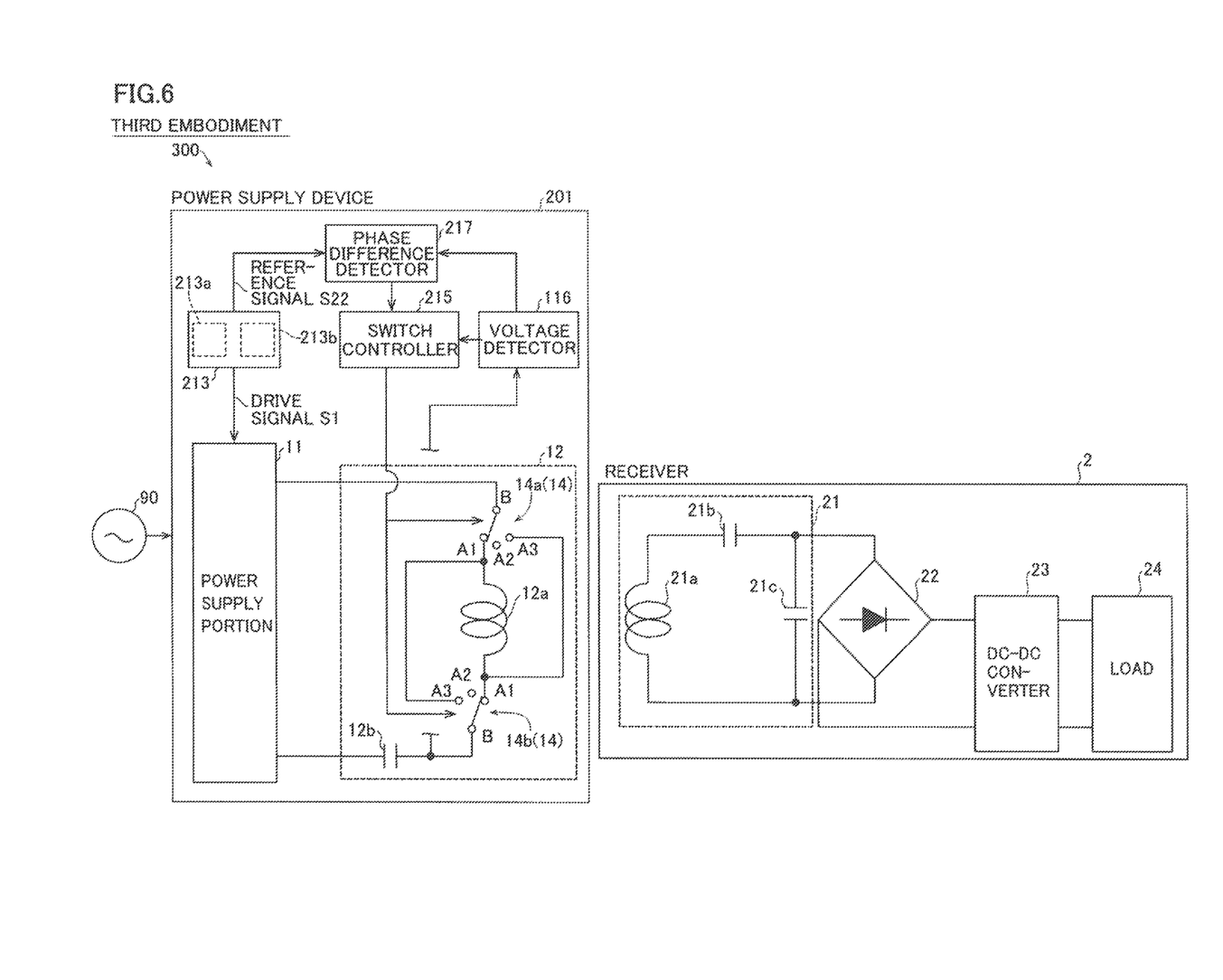
FIG. 6 illustrates the overall structure of a wireless power supply system according to a third embodiment of the present invention.
Figure 7:
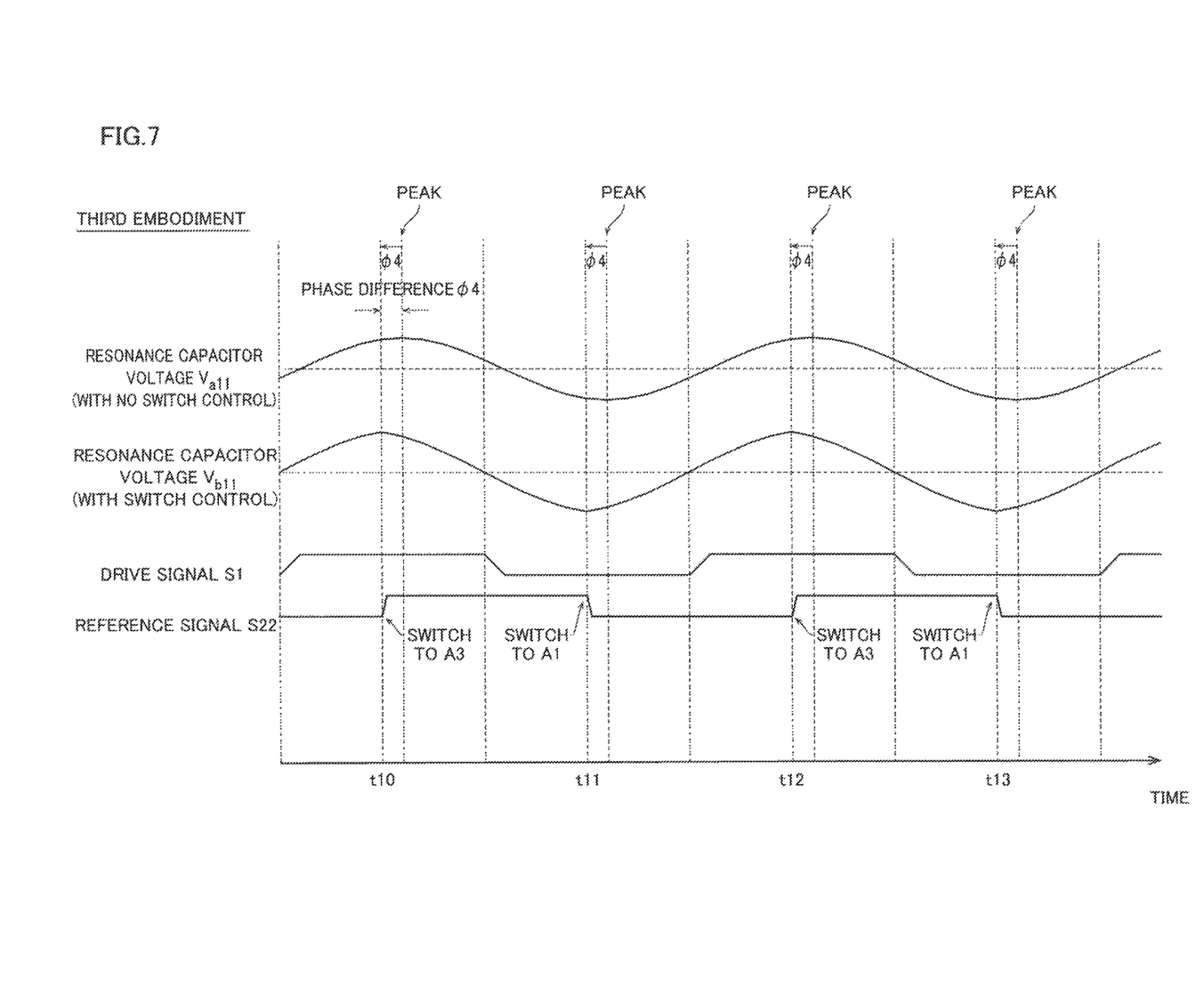
FIG. 7 illustrates a phase difference between the phase of a drive signal and the phase of a voltage waveform of a resonance circuit in a power supply device according to the third embodiment of the present invention.

As shown in FIG. 6, the wireless power supply system 300 according to the third embodiment of the present invention includes a power supply device 201. The power supply device 201 includes a signal generation portion 213, a switch controller 215, and a phase difference detector 217. The power supply device 201 is an example of the "wireless power supply device" in the claims. The switch controller 215 is an example of the "controller" in the claims.

According to the third embodiment, the signal generation portion 213 includes oscillators 213a and 213b. The oscillator 213a is configured to generate a drive signal S1 and to output the generated drive signal S1 to a power supply portion 11. The oscillator 213b is configured to generate the reference signal S22 whose phase is deviated by about 90 degrees with respect to a phase corresponding to the drive timing (the timing of the rising or falling edge) of the drive signal S1 and to output the generated reference signal S22 to the phase difference detector 217.

The phase difference detector 217 is configured to detect the phase difference φ4 between the phase of the reference signal S22 and the phase of a resonance capacitor voltage $V_{a11}$ on the basis of (based on) the reference signal S22 and a waveform (i.e. the resonance capacitor voltage $V_{a11}$) detected by a voltage detector 116. The phase difference detector 217 is configured to output the detected phase difference φ4 to the switch controller 215.

According to the third embodiment, the switch controller 215 is configured to acquire a time point when the phase is deviated by about 90 degrees with respect to the phase corresponding to the drive timing of the drive signal S1 on the basis of the phase difference φ4 detected by the phase difference detector 217. Specifically, the switch controller 215 is configured to acquire the time point when the phase is deviated by about 90 degrees with respect to the phase corresponding to the drive timing of the drive signal S1 by acquiring a plurality of time points t10, t11, t12, t13, . . . advanced by the phase difference φ4 from the peaks (time points of changing from rising to falling or from falling to rising) of the waveform of the resonance capacitor voltage $V_{a11}$ detected by the voltage detector 116.

The switch controller 215 is configured to control the switch portion 14 to switch the direction of the current that flows into the power supply coil 12a at the acquired time point when the phase is deviated by about 90 degrees with respect to the phase corresponding to the drive timing of the drive signal S1. Thus, the switch controller 215 is configured to substantially match the phase of the drive signal S1 and the phase of a resonance capacitor voltage as a resonance capacitor voltage $V_{b11}$ in FIG. 7. Also in the third embodiment, only the waveform (resonance capacitor voltage $V_{a11}$) whose phase is delayed with respect to the phase of the drive signal S1 is shown, but the phase can be substantially matched with the phase of the drive signal S1 similarly to the aforementioned first embodiment also in the case of the waveform whose phase is advanced.

The remaining structure of the wireless power supply system 300 according to the third embodiment is similar to that of the wireless power supply system 100 according to the first embodiment.

According to the third embodiment, the following effects can be obtained.

According to the third embodiment, as hereinabove described, the power supply device 201 is provided with the switch controller 215 that substantially matches the phase of the drive signal S1 and the phase of oscillation (resonance capacitor voltage $V_{a11}$) of the resonance circuit 12 by switching the direction of the current that flows into the power supply device 12a. Thus, a reduction in the efficiency of power transmission to a receiver 2 resulting from change of the resonant frequency of the resonance circuit 12 in the power supply device 201 can be significantly reduced or prevented while an increase in the size of the resonance circuit 12 and complication of the structure of the resonance circuit 12 are significantly reduced or prevented, similarly to the aforementioned first embodiment.

According to the third embodiment, as hereinabove described, the power supply device 201 is provided with the signal generation portion 213 that generates the reference signal S22 whose phase is deviated by about 90 degrees with respect to the phase corresponding to the drive timing of the drive signal S1 and the phase difference detector 217 that detects the phase difference φ4 between the phase of the reference signal S22 generated by the signal generation portion 213 and the phase of the oscillation of the resonance circuit 12. Furthermore, the switch controller 215 is configured to substantially match the phase of the drive signal S1 and the phase of the oscillation of the resonance circuit 12 by switching the direction of the current that flows into the power supply coil 12a on the basis of (based on) the phase difference φ4 between the phase of the reference signal S22 and the phase of the oscillation of the resonance circuit 12 detected by the phase difference detector 217. In general, the phase difference φ4 between the phase of the signal (reference signal S22) deviated by about 90 degrees with respect to the phase corresponding to the drive timing of the drive signal S1 and the phase of the oscillation of the resonance circuit 12 is more easily acquired than the phase difference φ3 between the phase of the drive signal S1 and the phase of the oscillation of the resonance circuit 12. Thus, the power supply device 201 is formed as described above, whereby the phase difference φ4 is more easily acquired, and the phase of the drive signal S1 and the phase of the oscillation of the resonance circuit 12 can be substantially matched.

The remaining effects of the third embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the present invention is applied to the power supply device 1 (101, 201) of the wireless power supply system 100 (200, 300) that wirelessly supplies and receives power by the magnetic field resonance method in each of the aforementioned first to third embodiments, the present invention is not restricted to this. The present invention may alternatively be applied to a wireless power supply device of a wireless power supply system that wirelessly supplies and receives power by a resonance method other than the magnetic field resonance method. The present invention may be applied to a wireless power supply device of an electric field resonance method, for example.

While the two switch elements 14a and 14b are employed to switch the direction of the current that flows into the power supply coil 12a in each of the aforementioned first to third embodiments, the present invention is not restricted to this. According to the present invention, three or more switch elements may alternatively be employed to switch the direction of the current that flows into the power supply coil.

While the phase of the oscillation of the resonance circuit 12 is employed as the phase of the AC voltage ($V_{a1}$, $V_{a2}$, and $V_{a11}$) generated in the resonance capacitor 12b in each of the aforementioned first to third embodiments, the present invention is not restricted to this. According to the present invention, the phase of the oscillation of the resonance circuit may alternatively be employed as the phase of the AC voltage generated in the power supply coil.

What is claimed is:

1. A wireless power supply device comprising:
   a resonance circuit including a coil and a capacitor;
   a power supply portion that supplies AC power to the resonance circuit based on a drive signal having a prescribed drive frequency; and
   a controller that matches a phase of the drive signal and a phase of oscillation of the resonance circuit by switching a direction of a current that flows into the coil based on a signal whose phase is deviated by 90 degrees with respect to a phase corresponding to drive timing of the drive signal.

2. The wireless power supply device according to claim 1, further comprising a phase difference detector that detects a phase difference between the phase of the drive signal and the phase of the oscillation of the resonance circuit, wherein
   the controller matches the phase of the drive signal and the phase of the oscillation of the resonance circuit by switching the direction of the current that flows into the coil based on the phase difference between the phase of the drive signal and the phase of the oscillation of the resonance circuit detected by the phase difference detector.

3. The wireless power supply device according to claim 1, wherein
   the resonance circuit is formed such that a phase difference between the phase of the drive signal and the phase of the oscillation of the resonance circuit is less than a quarter period.

4. The wireless power supply device according to claim 1, further comprising a signal generation portion that generates the signal whose phase is deviated by 90 degrees with respect to a phase corresponding to drive timing of the drive signal.

5. The wireless power supply device according to claim 4, wherein
   the controller matches the phase of the drive signal and the phase of the oscillation of the resonance circuit by switching the direction of the current that flows into the coil at a time point when the phase is deviated by 90 degrees with respect to the phase corresponding to the drive timing of the drive signal based on the signal generated by the signal generation portion.

6. The wireless power supply device according to claim 5, wherein
   the signal generation portion generates the signal that is rectangular wave-shaped, and
   the controller switches the direction of the current that flows into the coil at a time point corresponding to a rising or falling edge of the signal.

7. The wireless power supply device according to claim 1, further comprising a switch portion that switches the direction of the current that flows into the coil of the resonance circuit.

8. The wireless power supply device according to claim 1, wherein
   the resonance circuit includes:
   a first path allowing a current to flow into the coil from a prescribed direction, and
   a second path allowing a current to flow into the coil from a direction opposite to the prescribed direction.

9. The wireless power supply device according to claim 8, further comprising a switch portion that switches the direction of the current that flows into the coil of the resonance circuit by switching a path of the current that flows into the coil to either the first path or the second path.

10. The wireless power supply device according to claim 9, wherein
    the switch portion includes:
    a first switch element connected to a first end of the coil, and
    a second switch element connected to a second end of the coil, and
    the switch portion switches the path of the current that flows into the coil to either the first path or the second path by the first switch element and the second switch element.

11. The wireless power supply device according to claim 10, wherein
    the controller is a switch controller that matches the phase of the drive signal and the phase of the oscillation of the resonance circuit by controlling the first switch element and the second switch element.

12. The wireless power supply device according to claim 10, wherein
    the first switch element and the second switch element each include a semiconductor switch element.

13. The wireless power supply device according to claim 2, further comprising an oscillation detector that detects the oscillation of the resonance circuit, wherein
    the phase difference detector detects the phase difference between the phase of the drive signal and the phase of the oscillation of the resonance circuit based on the drive signal and the oscillation of the resonance circuit detected by the oscillation detector.

14. The wireless power supply device according to claim 1, further comprising:
    a signal generation portion that generates a signal whose phase is deviated by 90 degrees with respect to a phase corresponding to drive timing of the drive signal, and
    a phase difference detector that detects a phase difference between a phase of the signal generated by the signal generation portion and the phase of the oscillation of the resonance circuit, wherein
    the controller matches the phase of the drive signal and the phase of the oscillation of the resonance circuit by switching the direction of the current that flows into the coil based on the phase difference between the phase of the signal and the phase of the oscillation of the resonance circuit detected by the phase difference detector.

15. The wireless power supply device according to claim 1, wherein
    the controller matches the phase of the drive signal and the phase of the oscillation of the resonance circuit by switching the direction of the current that flows into the coil to switch a direction of a magnetic field generated in the coil.

16. A wireless power supply system comprising:
    a receiver; and
    a power supply device that wirelessly supplies power to the receiver, wherein
    the power supply device includes:
    a resonance circuit including a coil and a capacitor, a power supply portion that supplies AC power to the resonance circuit based on a drive signal having a prescribed drive frequency, and a controller that matches a phase of the drive signal and a phase of oscillation of the resonance circuit by switching a direction of a current that flows into the coil of the resonance circuit based on a signal whose phase is deviated by 90 degrees with respect to a phase corresponding to drive timing of the drive signal.

17. The wireless power supply system according to claim 16, wherein the power supply device further includes a phase difference detector that detects a phase difference between the phase of the drive signal and the phase of the oscillation of the resonance circuit, and the controller of the power supply device matches the phase of the drive signal and the phase of the oscillation of the resonance circuit by switching the direction of the current that flows into the coil based on the phase difference between the phase of the drive signal and the phase of the oscillation of the resonance circuit detected by the phase difference detector.

18. The wireless power supply system according to claim 16, wherein the resonance circuit of the power supply device is formed such that a phase difference between the phase of the drive signal and the phase of the oscillation of the resonance circuit is less than a quarter period.

19. The wireless power supply system according to claim 16, wherein the power supply device further includes a signal generation portion that generates the signal whose phase is deviated by 90 degrees with respect to a phase corresponding to drive timing of the drive signal.

20. A wireless power supply device comprising:

a resonance circuit including a coil and a capacitor;

a power supply portion that supplies AC power to the resonance circuit based on a drive signal having a prescribed drive frequency; and a controller that matches a phase of the drive signal and a phase of oscillation of the resonance circuit by switching a direction of a magnetic field generated in the coil based on a signal whose phase is deviated by 90 degrees with respect to a phase corresponding to drive timing of the drive signal.

* * * * *